United States Patent
Ye

(10) Patent No.: US 10,527,879 B1
(45) Date of Patent: Jan. 7, 2020

(54) LIQUID CRYSTAL DISPLAY PANEL AND MANUFACTURING METHOD FOR THE SAME

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Yanxi Ye, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/204,104

(22) Filed: Nov. 29, 2018

Related U.S. Application Data

(63) Continuation of application No. PCT/CN2018/104465, filed on Sep. 7, 2018.

(30) Foreign Application Priority Data

Jul. 16, 2018 (CN) .......................... 2018 1 0776943

(51) Int. Cl.
*G02F 1/1337* (2006.01)
*G02F 1/1335* (2006.01)
(Continued)

(52) U.S. Cl.
CPC ...... *G02F 1/133512* (2013.01); *G02F 1/1337* (2013.01); *G02F 1/1339* (2013.01);
(Continued)

(58) Field of Classification Search
CPC ......... G02F 1/133512; G02F 1/133514; G02F 1/1337; G02F 1/1339; G02F 2001/133357
See application file for complete search history.

(56) References Cited

U.S. PATENT DOCUMENTS

| 2016/0195741 A1* | 7/2016 | Shiau ................... G02F 1/1337 349/106 |
| 2017/0174990 A1* | 6/2017 | Rho .................... C09K 19/3003 |
| 2017/0176828 A1* | 6/2017 | Tseng ................ G02F 1/136286 |

FOREIGN PATENT DOCUMENTS

| CN | 106547137 A | 3/2017 |
| CN | 106597728 A | 4/2017 |

\* cited by examiner

*Primary Examiner* — Hoan C Nguyen
(74) *Attorney, Agent, or Firm* — Leong C. Lei

(57) ABSTRACT

A liquid crystal display panel and a manufacturing method are disclosed. The panel includes: an array substrate, a passivation layer, a planarization layer, a black photo spacer (BPS) material layer and a first alignment layer which are sequentially stacked on the array substrate, wherein a projection of the first alignment layer on the BPS material layer does not exceed a region of the BPS material layer; wherein the BPS material layer is provided with multiple grooves, the multiple grooves are distributed along an inner side of an edge of the BPS material layer, a sealant is formed on the BPS material layer; wherein the sealant and the first alignment layer are respectively located at two sides of the multiple grooves. The present invention does not prepare retaining walls on the array substrate, and the flow of the sealant and the first alignment layer can also be blocked.

14 Claims, 2 Drawing Sheets

(51) Int. Cl.
 *G02F 1/1339* (2006.01)
 *G02F 1/1333* (2006.01)
(52) U.S. Cl.
 CPC ............... *G02F 1/133514* (2013.01); *G02F 2001/133357* (2013.01)

LIQUID CRYSTAL DISPLAY PANEL AND MANUFACTURING METHOD FOR THE SAME

CROSS-REFERENCE TO RELATED APPLICATION

This application is a continuing application of PCT Patent Application No. PCT/CN2018/104465, entitled "LIQUID CRYSTAL DISPLAY PANEL AND MANUFACTURING METHOD FOR THE SAME", filed on Sep. 7, 2018, which claims priority to China Patent Application No. 201810776943.1 filed on Jul. 16, 2018, both of which are hereby incorporated in its entireties by reference.

FIELD OF THE INVENTION

The present invention relates to a display technology field, and more particularly to a liquid crystal display panel and manufacturing method for the same.

BACKGROUND OF THE INVENTION

BPS (Black photo spacer) technology is a technology that combines two processes of BM (black matrix) and PS (gap control) into one process of LCD (Liquid Crystal Display) technology. The technology can perform a BPS process on the color filter substrate side or the array substrate side. Performing a BPS process on the array substrate side, and then use a COA (Color on Array, integrating the color filter substrate with the array substrate) technology to integrate the array substrate and the color film into a box, and the corresponding color filter substrate side has only one layer of front ITO (indium tin oxide) electrode layer, and there is no remaining film pattern. This design can be used in situations where the flat display and the curved display are shared.

Whether the BPS process is prepared on the side of the array substrate or the side of the color filter substrate, the peripheral shading is achieved by the BPS material layer. Since there is no color resist, it is impossible to prepare a color barrier wall to block the flow of the sealant and PI (polyimide). Therefore, under BPS technology, the sealant and PI process need to be strictly controlled, and often there will be cases where the specification is exceeded.

FIG. 1 is a design of a sealant and a retaining wall of a liquid crystal display panel corresponding to the prior art, wherein 11' is a glass substrate, 12' is a gate metal, 13' is a source-drain metal, and 14' is a gate insulation layer, 2' is the passivation layer, 3' is the sealant, 4 and 5' are the alignment layer (for the polyimide material), 6' is the ITO electrode layer, 7' is the black matrix layer, and 8' is the color filter substrate. 9' is a retaining wall, and 11', 12', 13', and 14' form an array substrate. Since the BM process and the PS process are separated, and the planarization layer is not used, the color film substrate side can use the color resist to form a retaining wall between the sealant and the alignment layer, and the color resist is used as the alignment layer and on the side of the array substrate, the color resist is used to form a retaining wall between the alignment layer and the sealant.

FIG. 2 is a schematic view of a liquid crystal display panel prepared by using a BPS technology, wherein 11' is a glass substrate, 12' is a gate metal, 13' is a source-drain metal, 14' is a gate insulation layer, and 2' is a passivation layer. 3' is the sealant, 4 and 5' are the alignment layers, 6' is the ITO electrode layer, 8' is the color filter substrate, 10' is the planarization layer, 20' is the BPS material layer, 11', 12', 13' and 14' form an array substrate. Since there is no patterned film layer on the side of the color filter substrate, there is no design for the retaining wall. The BPS material layer on the side of the array substrate functions as a light-shielding effect, so that a convex retaining wall cannot be made, and even if the color resist is used as a retaining wall, the planarization layer and the BPS material layer are both organic layers, and both are very thick, so that the protrusion of the color-resist will be flattened by two layers of the organic layers, which will not function as a retaining wall.

SUMMARY OF THE INVENTION

In order to solve the above technology problem, the present invention provides a liquid crystal display panel and manufacturing method for the same, which does not prepare retaining walls on the array substrate, and the flow of the sealant and the first alignment layer can also be blocked, and the sealant and the first alignment layer on the array substrate are prevented from exceeding specifications during preparation.

The present invention provides a liquid crystal display panel, comprising: an array substrate; a passivation layer, a planarization layer, a black photo spacer (BPS) material layer and a first alignment layer which are sequentially stacked on the array substrate, wherein a projection of the first alignment layer on the BPS material layer does not exceed a region of the BPS material layer, wherein the BPS material layer is provided with multiple grooves, the multiple grooves are distributed along an inner side of an edge of the BPS material layer, a sealant is formed on the BPS material layer; wherein the sealant and the first alignment layer are respectively located at two sides of the multiple grooves.

Preferably, the array substrate is provided with a light-shielding metal, and a projection of the groove which is on the BPS material layer on the array substrate is located within the light-shielding metal 14 or coincides with the light-shielding metal.

Preferably, the array substrate includes a glass substrate and a gate metal and the light-shielding metal on the glass substrate, wherein the gate metal and the light-shielding metal are located in a same layer; a gate insulation layer and a source-drain metal are further formed on the glass substrate, the gate insulation layer covers the gate metal and the light-shielding metal, the source-drain electrode metal is formed on the gate insulation layer, and the passivation layer is formed on the gate insulation layer and the passivation layer covers the source-drain electrode metal.

Preferably, the multiple grooves are equally spaced on the inner side of each side of the BPS material layer; and the first alignment layer is located inside a region surrounded by the multiple grooves on the BPS material layer, and the sealant is located outside the region surrounded by the multiple grooves on the BPS material layer.

Preferably, the liquid crystal display panel further includes a second alignment layer, an ITO electrode layer, and a color filter substrate which are sequentially stacked along a direction away from the array substrate; and wherein the second alignment layer and the first alignment layer are oppositely disposed.

Preferably, a projection of the second alignment layer on the ITO electrode layer is located within the ITO electrode layer; wherein the array substrate and the color filter substrate are fixedly bonded together by the sealant, and both ends of the sealant are fixedly bonded to the ITO electrode layer and the passivation layer, respectively.

The present invention also provides a liquid crystal display panel, comprising: an array substrate; a passivation layer, a planarization layer, a black photo spacer (BPS) material layer and a first alignment layer which are sequentially stacked on the array substrate, wherein a projection of the first alignment layer on the BPS material layer does not exceed a region of the BPS material layer; wherein the BPS material layer is provided with multiple grooves, the multiple grooves are distributed along an inner side of an edge of the BPS material layer, a sealant is formed on the BPS material layer; wherein the sealant and the first alignment layer are respectively located at two sides of the multiple grooves; wherein the array substrate is provided with a light-shielding metal, and a projection of the groove which is on the BPS material layer on the array substrate is located within the light-shielding metal 14 or coincides with the light-shielding metal; wherein the multiple grooves are equally spaced on the inner side of each side of the BPS material layer; and wherein the first alignment layer is located inside a region surrounded by the multiple grooves on the BPS material layer, and the sealant is located outside the region surrounded by the multiple grooves on the BPS material layer.

Preferably, the array substrate includes a glass substrate and a gate metal and the light-shielding metal on the glass substrate, wherein the gate metal and the light-shielding metal are located in a same layer; a gate insulation layer and a source-drain metal are further formed on the glass substrate, the gate insulation layer covers the gate metal and the light-shielding metal, the source-drain electrode metal is formed on the gate insulation layer, and the passivation layer is formed on the gate insulation layer and the passivation layer covers the source-drain electrode metal.

Preferably, the liquid crystal display panel further includes a second alignment layer, an ITO electrode layer, and a color filter substrate which are sequentially stacked along a direction away from the array substrate; and wherein the second alignment layer and the first alignment layer are oppositely disposed.

Preferably, a projection of the second alignment layer on the ITO electrode layer is located within the ITO electrode layer; wherein the array substrate and the color filter substrate are fixedly bonded together by the sealant, and both ends of the sealant are fixedly bonded to the ITO electrode layer and the passivation layer, respectively.

The present invention also provides a manufacturing method for a liquid crystal display panel, comprising steps of: sequentially forming a passivation layer, a planarization layer, a BPS material layer on an array substrate; patterning the BPS material layer, forming multiple grooves at an inner side of an edge of the BPS material layer; forming a sealant and a first alignment layer on the BPS material layer, wherein the sealant and the first alignment layer are located at a same layer, and the sealant and the first alignment layer are respectively located at two sides of the multiple grooves.

Preferably, when patterning the BPS material layer, forming the multiple grooves equally spaced on the inner side of each side of the BPS material layer.

Preferably, the first alignment layer is located inside a region surrounded by the multiple grooves on the BPS material layer, and the sealant is located outside the region surrounded by the multiple grooves on the BPS material layer.

Preferably, the method further comprises steps of: sequentially forming an ITO electrode layer and a second alignment layer on a color filter substrate, wherein a projection of the second alignment layer on the ITO electrode layer is located within the ITO electrode layer; wherein the first alignment layer and the second alignment layer are disposed oppositely to each other, and the ITO electrode layer is fixedly bonded to the BPS material layer through the sealant.

The invention has the following beneficial effects: in the present invention, through forming multiple grooves on the BPS material layer, and manufacturing the sealant and the first alignment layer on both sides of the multiple grooves on the BPS material layer, when manufacturing the sealant and the first alignment layer, even if the material of the sealant or the first alignment layer is over flowed, it flows into the adjacent groove, so that the sealant or the first alignment layer can be prevented from exceeding the specification.

The present invention eliminates the need to prepare a retaining wall on the array substrate, and also prevents the flow of the sealant 5 material and the PI material on the BPS material layer. Because the first alignment layer corresponds to the effective display region of the liquid crystal display panel, the present invention can also prevent the material of the sealant from contaminating the effective display region of the liquid crystal display panel and affect the display effect of the liquid crystal display panel.

Next, the first alignment layer is generally prepared on the BPS material layer of the array substrate in advance. If the first alignment layer flows toward the edge of the BPS material layer, the sealant is formed on the first alignment layer. However, when the PI material of the first alignment layer is bonded to the sealant, peeling and the like are easily generated between the first alignment layer and the sealant, resulting in a relationship between the first alignment layer and the second alignment layer. The liquid crystal is exposed, and the color film substrate and the array substrate are separated. Therefore, the present invention can also reduce the risk of separation of the color filter substrate from the array substrate.

BRIEF DESCRIPTION OF THE DRAWINGS

In order to more clearly illustrate the embodiments of the present invention or the technical solutions in the prior art, the drawings used in the embodiments or the prior art description will be briefly introduced below. Obviously, the drawings in the following description are only some embodiments of the present invention. For those of ordinary skill in the art, without creative labor, other drawings can also be obtained from these figures.

DETAILED DESCRIPTION OF PREFERRED EMBODIMENTS

Figure 1:
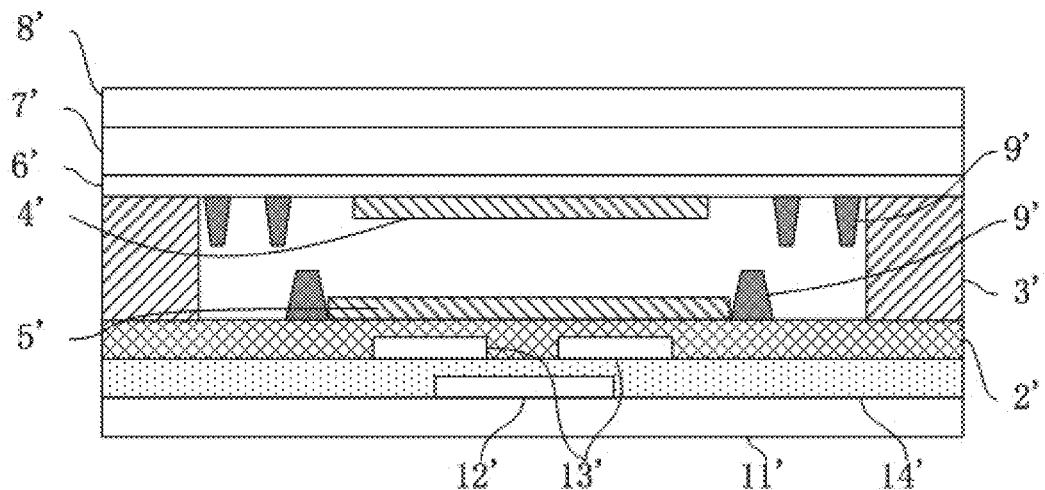
FIG. 1 is a schematic structural view of a liquid crystal display panel corresponding to the prior art in the background art provided by the present invention.
Figure 2:
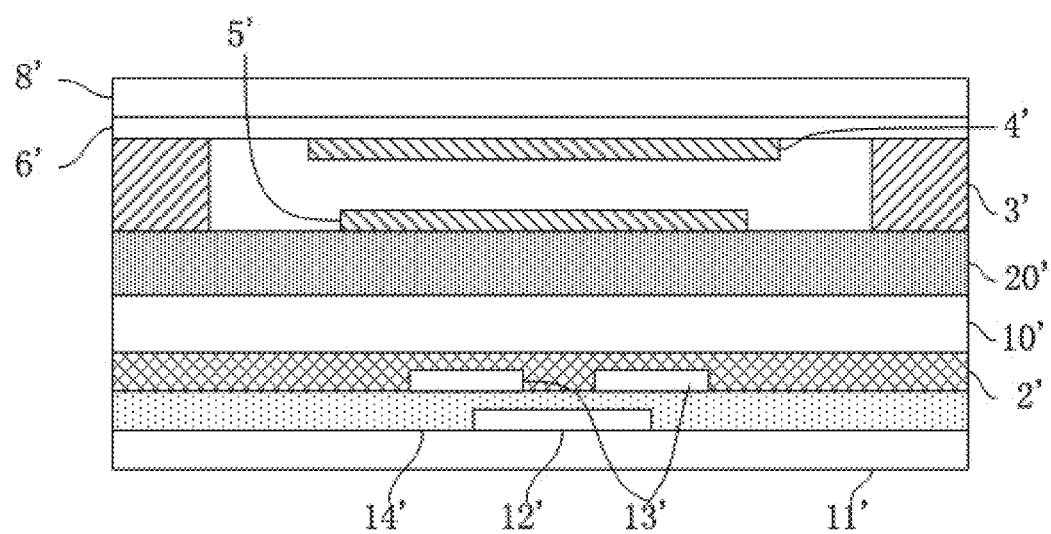
FIG. 2 is a schematic structural view of a liquid crystal display panel prepared by the BPS technology in the background art provided by the present invention.
Figure 3:
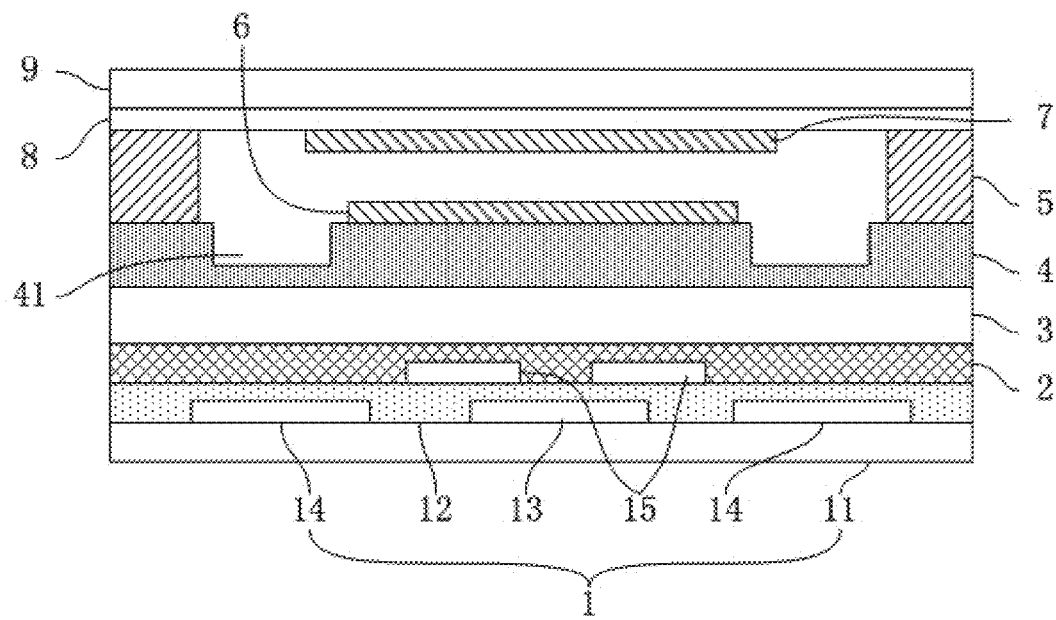
FIG. 3 is a schematic structural view of a liquid crystal display panel provided by the present invention.

The present invention provides a liquid crystal display panel. As shown in FIG. 3, the liquid crystal display panel includes: an array substrate 1, and a passivation layer 2, a planarization layer 3, a BPS (Black photo spacer) material layer 4 and a first alignment layer 6 which are sequentially stacked on the array substrate 1. A projection of the first alignment layer 6 on the BPS material layer 4 does not exceed a region of the BPS material layer 4. The material of the alignment layer is a polyimide material.

Figure 4:
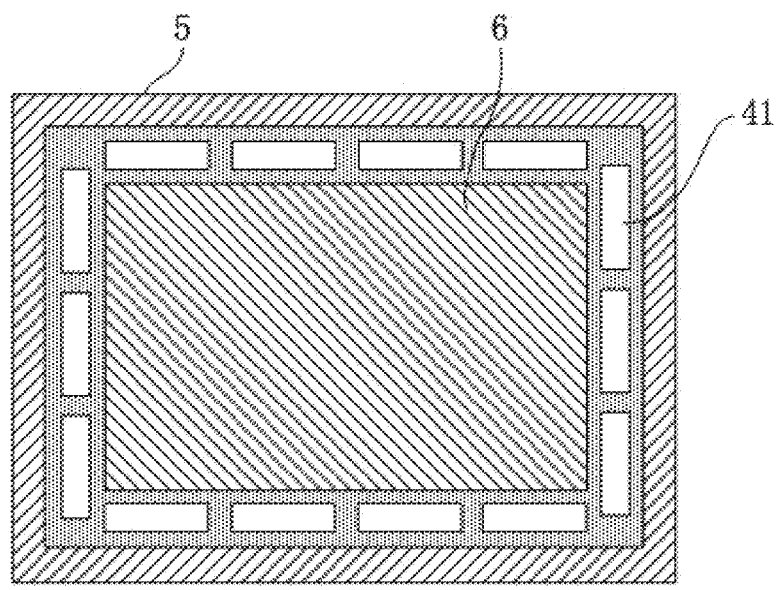
FIG. 4 is a schematic view of the first alignment layer, the BPS material layer, and the sealant viewed from a plan view provided by the present invention.

As shown in FIG. 4, multiple grooves 41 are provided on the BPS material layer 4, and the multiple grooves 41 are distributed along an inner side of an edge of the BPS material layer 4, and a sealant 5 is further formed on the BPS material layer 4. Wherein, the sealant 5 and the first alignment layer 6 are respectively located at two sides of the multiple grooves 41.

Here, since the BPS material layer 4 can be used as a black matrix material, it can be used for shading a light. The multiple grooves 41 are prepared on the BPS material layer 4. When the first alignment layer 6 and the sealant 5 are prepared, the sealant 5 and the first alignment layer 6 are prepared on two sides of the groove 41. When manufacturing the sealant 5 and the first alignment layer 6, if the sealant 5 or the PI material is over flowed, it will flow into the adjacent groove 41 to prevent the sealant 5 or the PI material from exceeding the specification due to the overflow.

It should be noted that the multiple grooves 41 are formed on the BPS material layer 4, but no via holes are formed at the grooves 41, that is, under the grooves 41, at least one thinner BPS material is existed, and still can shade the light.

Here, when the multiple grooves 41 are etched on the BPS material layer 4, a GTM (Gray tone mask) technology can be adopted, a thin layer of the BPS material 4 may be left under the groove 41. It also avoids the problem of reflection that occurs when the liquid crystal display panel is viewed as a whole. Specifically, when the BPS material layer 4 is patterned, etching by a process of coating photoresist and exposure development. At the time of exposure, the gray tone mask (a mask having a plurality of slits) is used for exposure, and light is diffracted when passing through the gray tone mask.

Furthermore, the array substrate 1 is provided with a light-shielding metal 14, and a projection of the groove 41 which is on the BPS material layer 4 on the array substrate 1 is located within the light-shielding metal 14 or coincides with the light-shielding metal 14.

Since the multiple grooves 41 are etched on the BPS material layer 4, the BPS material layer 4 below the grooves 41 is thin, and the light-shielding effect of the BPS material layer 4 is not very good comparing to the BPS material layer 4 at the other portions. Therefore, the light-shielding metal 14 corresponding to the groove 41 may be provided on the array substrate 1 to compensate for the defect that the light-shielding effect of the BPS material layer 4 at the groove 41 is insufficient. Here, the light-shielding metal 14 is preferably designed with a full-face metal to avoid light leakage.

Further, the array substrate 1 includes a glass substrate 11 and a gate metal 13 and a light-shielding metal 14 on the glass substrate 11; wherein the gate metal 13 and the light-shielding metal 14 are located in a same layer. That is, the gate metal 13 and the light-shielding metal 14 are made of a same layer of metal.

A gate insulation layer 12 and a source-drain metal 15 are further formed on the glass substrate 11. The gate insulation layer 12 covers the gate metal 13 and the light-shielding metal 14. The source-drain electrode metal 15 is formed on the gate insulation layer 12. The passivation layer 2 is formed on the gate insulation layer 12 and the passivation layer 2 covers the source-drain electrode metal 15.

Of course, an active layer and a gate metal 13 may also be disposed between the source-drain metal 15 and the gate insulation layer 12. The source-drain electrode metal 15 above the gate metal 13, the gate insulation layer 12, and the active layer form a thin-film transistor on the array substrate 1.

Furthermore, the multiple grooves 41 are equally spaced on the inner side of each side of the BPS material layer 4.

The first alignment layer 6 is located inside a region surrounded by the multiple grooves 41 on the BPS material layer 4, and the sealant 5 is located outside the region surrounded by the multiple grooves 41 on the BPS material layer 4.

The multiple grooves 41 are uniformly distributed on the inner side of each side of the BPS material layer 4 to avoid that the PI material is over flowed outside a region surrounded by the multiple grooves 41 and avoid that the sealant 5 is over flowed inside the region surrounded by the multiple grooves 41 when manufacturing the first alignment layer 6 or the sealant 5 so that a situation that the first alignment layer 6 or the sealant 5 exceed the specification is avoided.

Furthermore, the liquid crystal display panel provided by the present invention further includes a second alignment layer 7, an ITO (Indium Tin Oxide) electrode layer 8, and a color filter substrate 9 which are sequentially stacked along a direction away from the array substrate 1. The ITO electrode layer 8 serves as a common electrode for inputting a common electrical signal.

Wherein the second alignment layer 7 and the first alignment layer 6 are oppositely disposed. A liquid crystal layer may be disposed between the first alignment layer 6 and the second alignment layer 7, and the first alignment layer 6 and the second alignment layer 7 are used to align the liquid crystal layer.

Furthermore, a projection of the second alignment layer 7 on the ITO electrode layer 8 is located within the ITO electrode layer 8.

The array substrate 1 and the color filter substrate 9 are fixedly bonded together by the sealant 5, and both ends of the sealant 5 are fixedly bonded to the ITO electrode layer 8 and the passivation layer 2, respectively.

The present invention also provides a manufacturing method for a liquid crystal display panel, and the manufacturing method includes the following steps:

sequentially forming a passivation layer 2, a planarization layer 3, a BPS material layer 4 on an array substrate 1;

patterning the BPS material layer 4, forming multiple grooves 41 at an inner side of an edge of the BPS material layer 4;

forming a sealant 5 and a first alignment layer 6 on the BPS material layer 4, wherein the sealant 5 and the first alignment layer 6 are located at a same layer, and the sealant 5 and the first alignment layer 6 are respectively located at two sides of the multiple grooves 41.

Furthermore, when patterning the BPS material layer 4, forming the multiple grooves 41 equally spaced on the inner side of each side of the BPS material layer 4.

The first alignment layer 6 is located inside a region surrounded by the multiple grooves 41 on the BPS material layer 4, and the sealant 5 is located outside the region surrounded by the multiple grooves 41 on the BPS material layer 4.

Furthermore, the manufacturing method for a liquid crystal display panel further includes following steps:

Sequentially forming an ITO electrode layer 8 and a second alignment layer 7 on a color filter substrate 9, wherein a projection of the second alignment layer 7 on the ITO electrode layer 8 is located within the ITO electrode layer 8.

The first alignment layer 6 and the second alignment layer 7 are disposed oppositely to each other, and the ITO electrode layer 8 is fixedly bonded to the BPS material layer 4 through the sealant 5.

In summary, in the present invention, through forming multiple grooves 41 on the BPS material layer 4, and manufacturing the sealant 5 and the first alignment layer 6 on both sides of the multiple grooves 41 on the BPS material layer 4, when manufacturing the sealant 5 and the first alignment layer 6, even if the material of the sealant 5 or the first alignment layer 6 is over flowed, it flows into the adjacent groove 41, so that the sealant 5 or the first alignment layer 6 can be prevented from exceeding the specification.

The present invention eliminates the need to prepare a retaining wall on the array substrate 1, and also prevents the flow of the sealant 5 material and the PI material on the BPS material layer 4. Because the first alignment layer 6 corresponds to the effective display region of the liquid crystal display panel, the present invention can also prevent the material of the sealant 5 from contaminating the effective display region of the liquid crystal display panel and affect the display effect of the liquid crystal display panel.

Next, the first alignment layer 6 is generally prepared on the BPS material layer 4 of the array substrate 1 in advance. If the first alignment layer 6 flows toward the edge of the BPS material layer 4, the sealant 5 is formed on the first alignment layer 6. However, when the PI material of the first alignment layer 6 is bonded to the sealant 5, peeling and the like are easily generated between the first alignment layer 6 and the sealant 5, resulting in a relationship between the first alignment layer 6 and the second alignment layer 7. The liquid crystal is exposed, and the color film substrate 9 and the array substrate 1 are separated. Therefore, the present invention can also reduce the risk of separation of the color filter substrate 9 from the array substrate 1.

Furthermore, a light-shielding metal 14 is formed on the array substrate 1 below the groove 41 of the BPS material layer 4, which compensates for the defect that the light-shielding effect caused by the thin BPS material layer 4 under the groove 41 is poor.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display panel, comprising:
an array substrate;
a passivation layer, a planarization layer, a black photo spacer (BPS) material layer and a first alignment layer which are sequentially stacked on the array substrate, wherein the black photo spacer (BPS) material layer is used as a black matrix material and photo spacers in a display area of the liquid crystal display panel, and a projection of the first alignment layer on the BPS material layer does not exceed a region of the BPS material layer;
wherein the BPS material layer is provided with multiple grooves, the multiple grooves are distributed along an inner side of an edge of the BPS material layer, a sealant is formed on the BPS material layer;
wherein the sealant and the first alignment layer are respectively located at two sides of the multiple grooves.

2. The liquid crystal display panel according to claim 1, wherein the array substrate is provided with a light-shielding metal, and a projection of the groove which is on the BPS material layer on the array substrate is located within the light-shielding metal 14 or coincides with the light-shielding metal.

3. The liquid crystal display panel according to claim 2, wherein the array substrate includes a glass substrate and a gate metal and the light-shielding metal on the glass substrate, wherein the gate metal and the light-shielding metal are located in a same layer;
a gate insulation layer and a source-drain metal are further formed on the glass substrate, the gate insulation layer covers the gate metal and the light-shielding metal, the source-drain electrode metal is formed on the gate insulation layer, and the passivation layer is formed on the gate insulation layer and the passivation layer covers the source-drain electrode metal.

4. The liquid crystal display panel according to claim 1, wherein the multiple grooves are equally spaced on the inner side of each side of the BPS material layer; and
the first alignment layer is located inside a region surrounded by the multiple grooves on the BPS material layer, and the sealant is located outside the region surrounded by the multiple grooves on the BPS material layer.

5. The liquid crystal display panel according to claim 1, wherein the liquid crystal display panel further includes a second alignment layer, an ITO electrode layer, and a color filter substrate which are sequentially stacked along a direction away from the array substrate; and
wherein the second alignment layer and the first alignment layer are oppositely disposed.

6. The liquid crystal display panel according to claim 5, wherein a projection of the second alignment layer on the ITO electrode layer is located within the ITO electrode layer;
wherein the array substrate and the color filter substrate are fixedly bonded together by the sealant, and both ends of the sealant are fixedly bonded to the ITO electrode layer and the passivation layer, respectively.

7. A liquid crystal display panel, comprising:
an array substrate;
a passivation layer, a planarization layer, a black photo spacer (BPS) material layer and a first alignment layer which are sequentially stacked on the array substrate, wherein the black photo spacer (BPS) material layer is used as a black matrix material and photo spacers in a display area of the liquid crystal display panel, and a projection of the first alignment layer on the BPS material layer does not exceed a region of the BPS material layer;
wherein the BPS material layer is provided with multiple grooves, the multiple grooves are distributed along an inner side of an edge of the BPS material layer, a sealant is formed on the BPS material layer;
wherein the sealant and the first alignment layer are respectively located at two sides of the multiple grooves;
wherein the array substrate is provided with a light-shielding metal, and a projection of the groove which is on the BPS material layer on the array substrate is located within the light-shielding metal 14 or coincides with the light-shielding metal;
wherein the multiple grooves are equally spaced on the inner side of each side of the BPS material layer; and wherein the first alignment layer is located inside a region surrounded by the multiple grooves on the BPS material layer, and the sealant is located outside the region surrounded by the multiple grooves on the BPS material layer.

8. The liquid crystal display panel according to claim 7, wherein the array substrate includes a glass substrate and a gate metal and the light-shielding metal on the glass substrate, wherein the gate metal and the light-shielding metal are located in a same layer;

a gate insulation layer and a source-drain metal are further formed on the glass substrate, the gate insulation layer covers the gate metal and the light-shielding metal, the source-drain electrode metal is formed on the gate insulation layer, and the passivation layer is formed on the gate insulation layer and the passivation layer covers the source-drain electrode metal.

9. The liquid crystal display panel according to claim 7, wherein the liquid crystal display panel further includes a second alignment layer, an ITO electrode layer, and a color filter substrate which are sequentially stacked along a direction away from the array substrate; and wherein the second alignment layer and the first alignment layer are oppositely disposed.

10. The liquid crystal display panel according to claim 9, wherein a projection of the second alignment layer on the ITO electrode layer is located within the ITO electrode layer;

wherein the array substrate and the color filter substrate are fixedly bonded together by the sealant, and both ends of the sealant are fixedly bonded to the ITO electrode layer and the passivation layer, respectively.

11. A manufacturing method for a liquid crystal display panel, comprising steps of:

sequentially forming a passivation layer, a planarization layer, a black photo spacer (BPS) material layer on an array substrate, wherein the black photo spacer (BPS) material layer is used as a black matrix material and photo spacers in a display area of the liquid crystal display panel;

patterning the BPS material layer, and forming multiple grooves at an inner side of an edge of the BPS material layer;

forming a sealant and a first alignment layer on the BPS material layer, wherein the sealant and the first alignment layer are located at a same layer, and the sealant and the first alignment layer are respectively located at two sides of the multiple grooves.

12. The manufacturing method for a liquid crystal display panel according to claim 11, wherein when patterning the BPS material layer, forming the multiple grooves equally spaced on the inner side of each side of the BPS material layer.

13. The manufacturing method for a liquid crystal display panel according to claim 12, wherein the first alignment layer is located inside a region surrounded by the multiple grooves on the BPS material layer, and the sealant is located outside the region surrounded by the multiple grooves on the BPS material layer.

14. The manufacturing method for a liquid crystal display panel according to claim 11, wherein the method further comprises steps of:

sequentially forming an ITO electrode layer and a second alignment layer on a color filter substrate, wherein a projection of the second alignment layer on the ITO electrode layer is located within the ITO electrode layer;

wherein the first alignment layer and the second alignment layer are disposed oppositely to each other, and the ITO electrode layer is fixedly bonded to the BPS material layer through the sealant.

\* \* \* \* \*